(12) United States Patent
Yoo

(10) Patent No.: US 10,261,231 B2
(45) Date of Patent: Apr. 16, 2019

(54) DISPLAY APPARATUS

(71) Applicant: SAMSUNG ELECTRONICS CO., LTD., Suwon-si (KR)

(72) Inventor: Jun-Mo Yoo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/707,465

(22) Filed: Sep. 18, 2017

(65) Prior Publication Data

US 2018/0120494 A1    May 3, 2018

(30) Foreign Application Priority Data

Oct. 28, 2016  (KR) .................. 10-2016-0142343

(51) Int. Cl.
| | | |
|---|---|---|
| *G02F 1/1335* | (2006.01) | |
| *F21V 8/00* | (2006.01) | |
| *G02F 1/1333* | (2006.01) | |
| *G02F 1/13357* | (2006.01) | |

(52) U.S. Cl.
CPC ......... *G02B 6/0025* (2013.01); *G02B 6/0031* (2013.01); *G02B 6/0051* (2013.01); *G02B 6/0081* (2013.01); *G02B 6/0083* (2013.01); *G02B 6/0091* (2013.01); *G02B 6/009* (2013.01); *G02B 6/0088* (2013.01); *G02F 1/1336* (2013.01); *G02F 1/133308* (2013.01); *G02F 1/133524* (2013.01); *G02F 1/133615* (2013.01); *G02F 2001/133317* (2013.01); *G02F 2001/133601* (2013.01)

(58) Field of Classification Search
CPC .. G02B 6/0028; G02B 6/0081; G02B 6/0091; G02B 6/0088; G02F 1/133524; G02F 1/133603
See application file for complete search history.

(56) References Cited

U.S. PATENT DOCUMENTS

| | | |
|---|---|---|
| 2007/0091640 A1 | 4/2007 | Kim et al. |
| 2010/0290246 A1 | 11/2010 | Kim et al. |
| 2011/0102452 A1 | 5/2011 | Yun et al. |
| 2012/0057367 A1 | 3/2012 | Park |
| 2012/0106198 A1 | 5/2012 | Lin et al. |

(Continued)

FOREIGN PATENT DOCUMENTS

| | | |
|---|---|---|
| CN | 103047585 A | 4/2013 |
| KR | 10-2012-0064524 A | 6/2012 |

(Continued)

OTHER PUBLICATIONS

International Search Report dated Jan. 26, 2018 by the International Searching Authority in counterpart International Patent Application No. PCT/KR2017/011245. (PCT/ISA/210).

(Continued)

*Primary Examiner* — Thanh Nhan P Nguyen
(74) *Attorney, Agent, or Firm* — Sughrue Mion, PLLC

(57) ABSTRACT

A display apparatus including a round portion is provided. The display apparatus includes: a display panel; a light guide plate configured to guide light toward the display panel, the light guide plate comprising a flat portion and a round portion; and a printed circuit board (PCB) including a first area configured to radiate light toward the round portion, and a second area configured to radiate light toward the flat portion, wherein a width of the first area is less than a width of the second area.

20 Claims, 13 Drawing Sheets

(56) References Cited

U.S. PATENT DOCUMENTS

2013/0010233 A1    1/2013   Seo et al.
2013/0077348 A1    3/2013   Byun et al.
2014/0176868 A1    6/2014   Zhu et al.
2015/0370004 A1    12/2015  Fu

FOREIGN PATENT DOCUMENTS

KR   10-2013-0001522 A   1/2013
WO      2009/084894 A1   7/2009

OTHER PUBLICATIONS

Communication dated Mar. 14, 2018 by the European Patent Office in counterpart European Patent Application No. 17192756.9.

DISPLAY APPARATUS

CROSS-REFERENCE TO RELATED APPLICATION

This application claims the priority from Korean Patent Application No. 10-2016-0142343, filed on Oct. 28, 2016 in the Korean Intellectual Property Office, the disclosure of which is incorporated herein by reference.

BACKGROUND

1. Field

Apparatuses consistent with example embodiments relate to a display apparatus.

2. Description of the Related Art

In general, a display apparatus is a device for displaying a screen. Examples of the display apparatus include a monitor and a television. The display apparatus may use a self-emissive display panel such as an organic light-emitting diode (OLED) panel, or a light-receiving display panel such as a liquid crystal display (LCD) panel.

A display apparatus may include a display panel (for example, a light-receiving display panel such as a LCD panel) on which a screen is displayed, and a backlight unit disposed behind the display panel.

The backlight unit may include a light source disposed behind the display panel to generate light. Recently, display apparatuses having various shapes, such as a round shape, are being developed to improve the design of the display apparatus. However, a display apparatus having a round portion requires a light source capable of radiating light to the round portion.

SUMMARY

Example embodiments provide a display apparatus including a round portion and a light source capable of effectively radiating light to the round portion.

According to an aspect of an example embodiment, there is provided a display apparatus including: a display panel; a light guide plate configured to guide light toward the display panel, the light guide plate comprising a flat portion and a round portion; and a printed circuit board (PCB) comprising a first area configured to radiate light toward the round portion, and a second area configured to radiate light toward the flat portion, wherein a width of the first area is less than a width of the second area.

The PCB may further include a curved surface provided in the first area and corresponding to the round portion of the light guide plate.

The PCB may further include a plurality of light sources disposed in the first area and the second area, wherein first light sources disposed in the first area among the plurality of light sources are disposed at equidistant intervals.

The first area may include a flexible material.

The first area may be disposed at opposite ends of the second area.

The display panel may include a first round portion corresponding to the round portion of the light guide plate.

The display apparatus may further include: a top chassis disposed in front of the display panel and including a second round portion corresponding to the round portion of the light guide plate; a bottom chassis disposed behind the display panel and coupled with the top chassis, and including a third round portion corresponding to the round portion of the light guide plate; and a middle mold disposed between the top chassis and the bottom chassis and including a fourth round portion corresponding to the round portion of the light guide plate.

The curved surface of the PCB may be supported by the fourth round portion of the middle mold.

The first area may be separable from the second area.

The PCB may further include a connector configured to connect the first area to the second area, and to transfer an electrical signal from the second area to the first area.

The PCB may further include: a plurality of light sources; a light source mounted portion on which the plurality of light sources are disposed; and a light source non-mounted portion on which none of the plurality of light sources is disposed, wherein the light source non-mounted portion is disposed in the second area.

The light source mounted portion may be orthogonal to the light source non-mounted portion.

The PCB may be configured to control brightness of light radiated by the plurality of light sources to perform local dimming.

According to an aspect of another example embodiment, there is provided display apparatus including: a display panel including a first round portion; a top chassis disposed in front of the display panel, and including a second round portion corresponding to the first round portion of the display panel; a bottom chassis disposed behind the display panel, and including a third round portion corresponding to the first round portion of the display panel; a middle mold disposed between the top chassis and the bottom chassis, and including a fourth round portion corresponding to the first round portion of the display panel; a light guide plate supported by the middle mold, and including a fifth round portion corresponding to the first round portion of the display panel; and a printed circuit board (PCB) including a plurality of light sources configured to radiate light, a mounted portion on which the plurality of light sources are disposed, and a non-mounted portion on which none of the plurality of light sources is disposed, wherein the mounted portion includes a round area corresponding to the fifth round portion of the light guide plate, and wherein the non-mounted portion is disposed outside the round area.

The first round portion may include a plurality of first round portions disposed at four corners of the display panel, the fourth round portion may include a plurality of fourth round portions, the fifth round portion comprises a plurality of fifth round portions, and the plurality of fourth round portions and the plurality of fifth round portions are disposed at four corners of the middle mold and four corners of the light guide plate, respectively, to correspond to the plurality of first round portions.

The round area may be disposed between the fourth round portion and the fifth round portion.

The round area may include a flexible material.

According to an aspect of another example embodiment, there is provided display apparatus including: a display panel; a light guide plate configured to guide light toward the display panel, and including a flat portion and a round portion; a reflective member configured to guide light toward the round portion of the light guide plate, and disposed facing a side surface of the round portion; a printed circuit board (PCB); a first light source disposed on the PCB and configured to radiate light to the flat portion; and a second light source disposed on the PCB and configured to radiate light to the reflective member.

The reflective member may include a curved surface corresponding to the round portion.

The reflective member may include an auxiliary light guide plate configured to guide light radiated from the second light source toward the round portion of the light guide plate.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1:
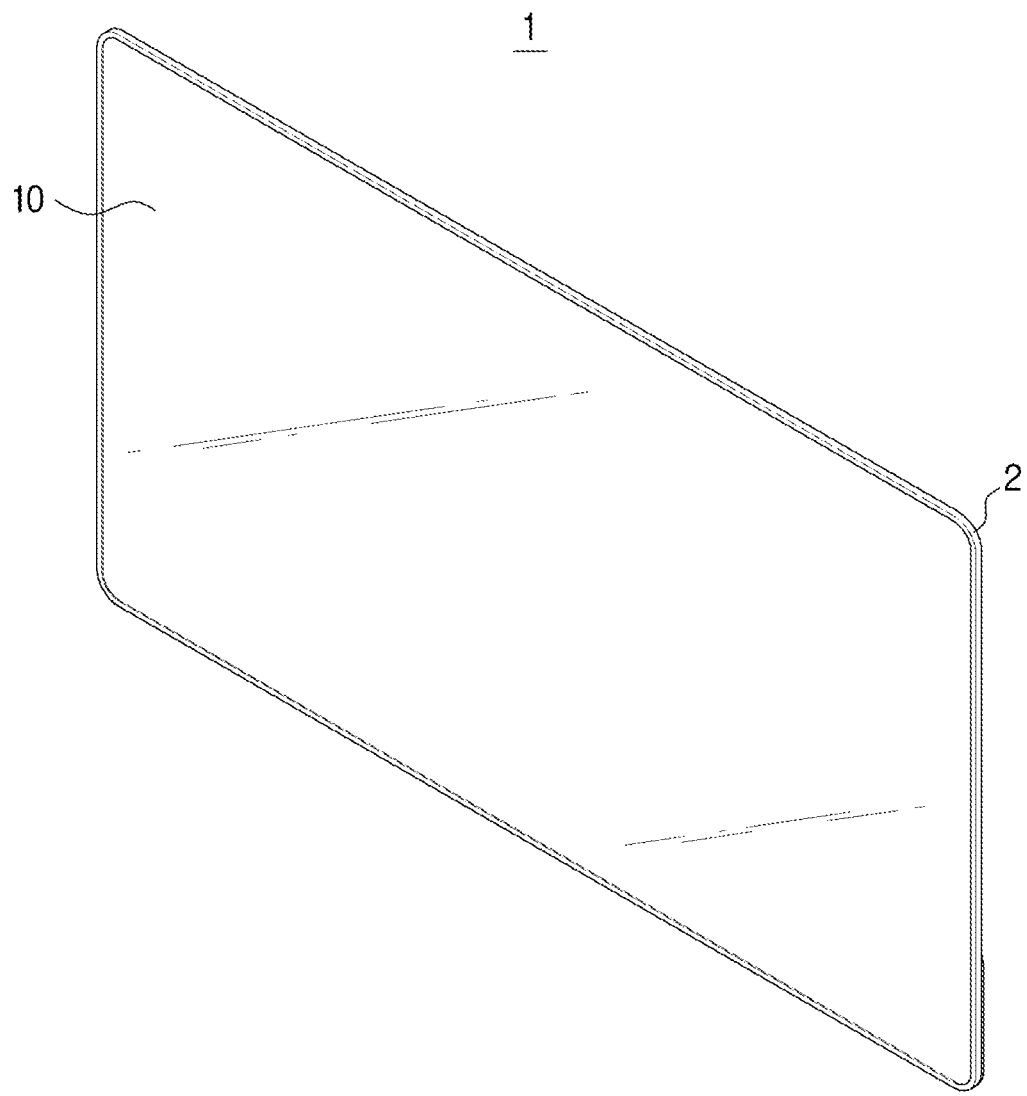
FIG. 1 is a perspective view of a display apparatus according to an example embodiment.

Example embodiments will now be described more fully with reference to the accompanying drawings. These example embodiments are described in sufficient detail to enable those skilled in the art to practice the inventive concept, and it is to be understood that the example embodiments are not intended to limit the present disclosure to particular modes of practice, and it is to be appreciated that all modification, equivalents, and alternatives that do not depart from the spirit and technical scope of the present disclosure are encompassed in the present disclosure.

In the drawings, like reference numerals or symbols represent members or components performing the substantially same functions.

Also, the terms used in the present specification are used for the purpose of describing the example embodiments, and not for the purpose of limiting and/or restricting the present disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, operations, components, or combination thereof, but do not preclude the presence or addition of one or more other features, figures, steps, components, members, or combinations thereof.

It will be understood that, although the terms "first," "second," etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, the example embodiments will be described in detail with reference to the accompanying drawings.

Hereinafter, a flat panel display apparatus will be described as an example embodiment, however, aspects of the present disclosure are not limited thereto, and may also be applied to a curved display apparatus, a bendable or flexible display apparatus that can change its shape between a curved shape and a flat shape, etc.

Also, a display apparatus according to an example embodiment may be applied to various types of displays regardless of their respective screen sizes. For example, the display apparatus according to an example embodiment can be applied to a product, such as a smart television and a monitor, which can be mounted on a table, a wall, or a ceiling, or to a portable product, such as a tablet, a laptop computer, a smart phone, e-book, etc.

Also, in this specification, the terms "front direction" and "front surface" are defined based on the front surface of a display panel on which images are displayed in a display apparatus shown in FIG. 1. Also, the terms "upper portion" and "lower portion" respectively represent the upper portion and the lower portion of the display apparatus shown in FIG. 1, and the terms "both sides" or "side portions" represent the left and right portions of the display apparatus shown in FIG. 1.

Figure 2:
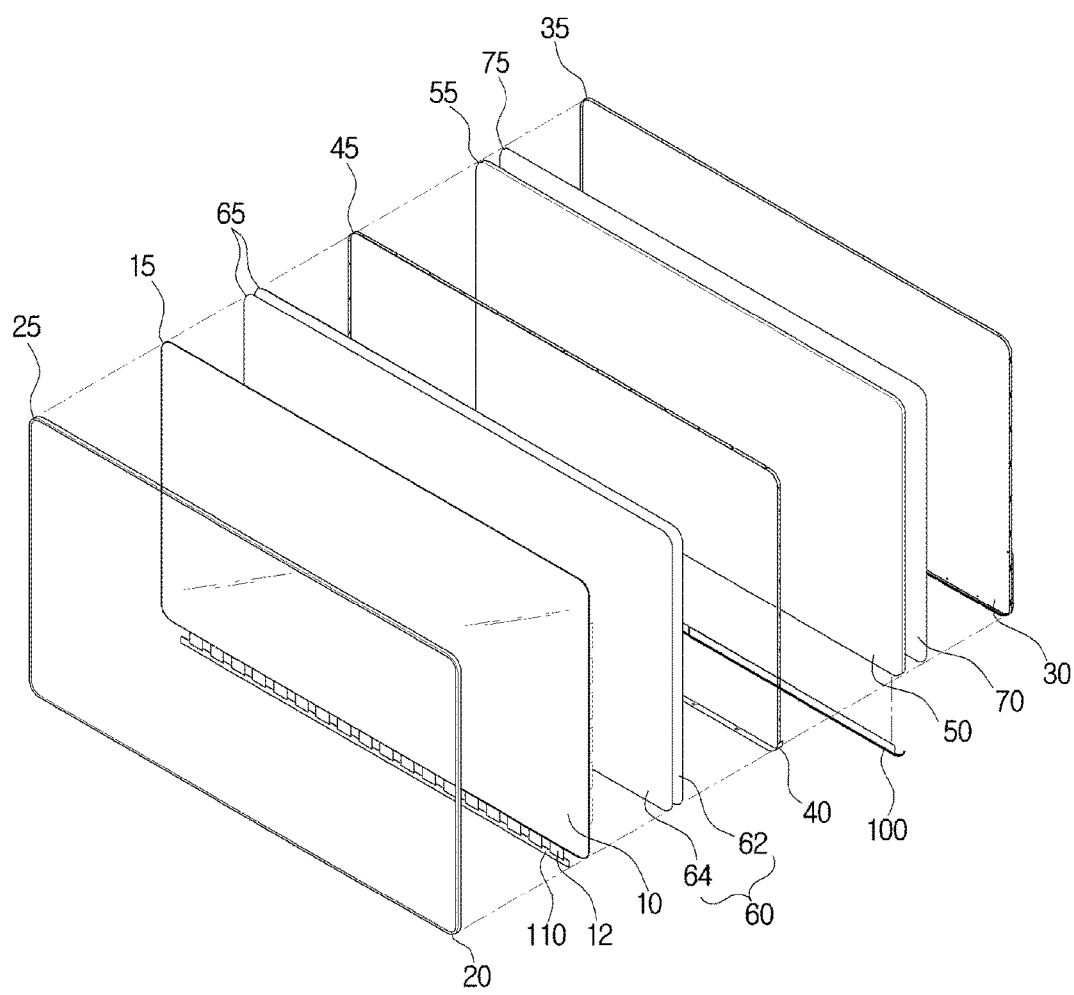
FIG. 2 is an exploded perspective view of a display apparatus according to an example embodiment.

As shown in FIGS. 1 and 2, a display apparatus 1 may include a display panel 10 configured to display images, a light guide plate 50 disposed behind the display panel 10, and configured to diffuse light transferred from a light source and to transfer the diffused light to the display panel 10, an optical sheet 60 disposed between the display panel 10 and the light guide plate 50, and configured to improve the optical characteristics of light diffused by the light guide plate 50, a top chassis 20 coupled with a front portion of the display panel 10, and a bottom chassis 30 coupled with a rear portion of the top chassis 20. In addition, the display apparatus 1 may further include a middle mold 40 disposed between the top chassis 20 and the bottom chassis 30, and configured to support the display panel 10 and the light guide plate 50. The display apparatus 1 may further include a reflective plate 70 disposed behind the light guide plate 50, and configured to reflect light transferred from the light guide plate 50 towards a front direction.

The display apparatus 1 may include a light source module 100 (see FIG. 3) having a plurality of light sources 120 to generate light. The light source module 100 may include a printed circuit board (PCB) 110 on which the plurality of light sources 120 are disposed.

The light source module 100 may be disposed along at least one side surface of the four side surfaces of the light guide plate 50 to radiate light to the side surface of the light guide plate 50, and thereby radiating light to the display apparatus 1. The light source module 100 will be described in more detail.

The display panel 10 may be a liquid crystal panel formed by filling and sealing liquid crystal between two glass substrates on which electrodes are formed. A PCB 110 may be disposed below the display panel 10 to transfer information to the display panel 10. Also, a chip-on-film (COF) 12 may be disposed below the display panel 10 to electrically connect the PCB 110 to the display panel 10.

The optical sheet 60 may include a diffusion sheet 62 to diffuse light transferred through the light guide plate 50, a prism sheet 64 to focus the diffused light in a direction that is normal to the surface of the display panel 10, and a protective sheet to protect the prism sheet 64.

The top chassis 20 may be disposed on the front portion of the display panel 10, and coupled with the bottom chassis 30 disposed behind the display panel 10. The display panel 10, the optical sheet 60, and the light guide plate 50 may be disposed between the top chassis 20 and the bottom chassis 30, and supported by the middle mold 40 in a space formed when the top chassis 20 is coupled with the bottom chassis 30.

According to an example embodiment, the top chassis 20 may form the outer appearance of the front surface of the display apparatus 1 with or without a separate cover member. For example, the top chassis 20 may form the front outer appearance of the display apparatus 1 alone, or a separate cover member such as a bezel may be additionally disposed in front of the top chassis 20 to form the outer appearance of the display apparatus 1.

According to an example embodiment, the bottom chassis 30 may form the outer appearance of a rear surface of the display apparatus 1 with or without a separate cover member. For example, the bottom chassis 30 may form the outer appearance of the display apparatus 1 alone, or a cover member may be additionally disposed behind the bottom chassis 30 to form the outer appearance of the display apparatus 1.

A display apparatus, such as, a television (TV), may include a quadrangular display panel and may have a quadrangular outer appearance. Recently, display apparatuses having various shapes other than a quadrangle shape are being developed to improve the aesthetics of the outer appearances of the display apparatuses.

In the display apparatus 1 according to the current example embodiment, the display panel 10 and components included in the display apparatus 1 may include rounded corners such as round portions 15, 25, 35, 45, 55, 65, and 75 as shown in FIG. 2. Accordingly, the display apparatus 1 may have rounded corners in an outer appearance.

For example, the display panel 10 may include four first round portions 15 formed at four corners, and the top chassis 20 may include four second round portions 25 formed at four corners, and disposed in front of the first round portions 15 and aligned to correspond to the first round portions 15.

The bottom chassis 30 may include four third round portions 35 formed at four corners, and disposed behind the first round portions 15 and aligned to correspond to the first round portions 15, and the middle mold 40 may include four fourth round portions 45 formed at four corners, and disposed behind the first round portions 15 and aligned to correspond to the first round portions 15.

The light guide plate 50 may also include four fifth round portions 55 formed at four corners, and disposed behind the first round portions 15 and aligned to correspond to the first round portions 15. The optical sheet 60 may include four sixth round portions 65 formed at four corners, and disposed behind the first round portions 15 and aligned to correspond to the first round portions 15, and the reflective plate 70 may include four seventh round portions 75 formed at four corners, and disposed behind the first round portions 15 and aligned to correspond to the first round portions 15.

Accordingly, in an example embodiment, the display apparatus 1 may have four rounded corners 2, as shown in FIG. 1. However, embodiments are not limited thereto, and at least one of the four corners 2 may be rounded and include the round portions 15, 25, 35, 45, 55, 65, and 75.

For example, instead of the round portions 15, 25, 35, 45, 55, 65, and 75 being disposed in all the four corners 2, the round portions 15, 25, 35, 45, 55, 65, and 75 may be disposed in one to three of the four corners 2.

Hereinafter, the light source module 100 will be described in detail.

Since the first round portions 15 are disposed in the corners 2 of the display panel 10, as described above, it may be important whether light can be sufficiently radiated to the first round portions 15 on the four corners of the display panel.

The display apparatus 1 according to an example embodiment may include an edge type backlight unit. In an edge type backlight unit, a light source module may be formed in a bar shape being disposed along at least one of the four side surfaces of a quadrangular light guide plate to radiate light to the side surface of the light guide plate so that light can be transferred in a front direction from the light guide plate.

However, since the light guide plate 50 according to an example embodiment includes the fifth round portions 55 corresponding to the first round portions 15 of the display panel 10 at the corners, light may not be effectively radiated to the side surface 50a formed as a curved surface in the fifth round portions 55 if a light source module formed in a bar shape is disposed along the side surface 50a of the light guide plate 50.

Figure 3:
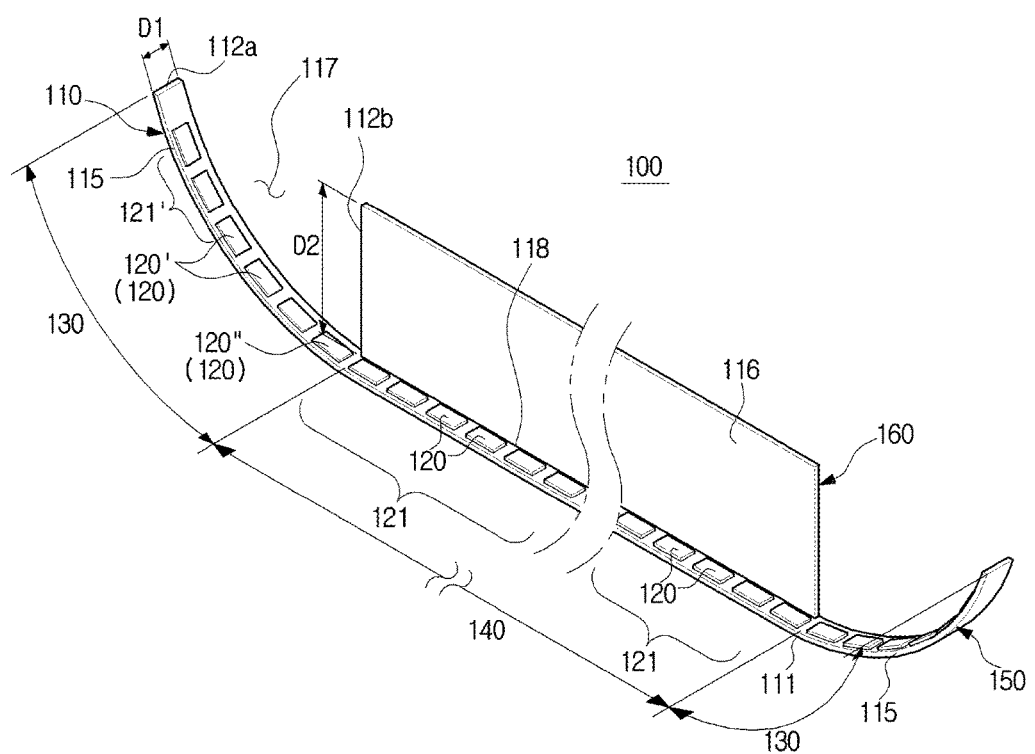
FIG. 3 is a perspective view of a printed circuit board (PCB) of a display apparatus according to an example embodiment.
Figure 4:
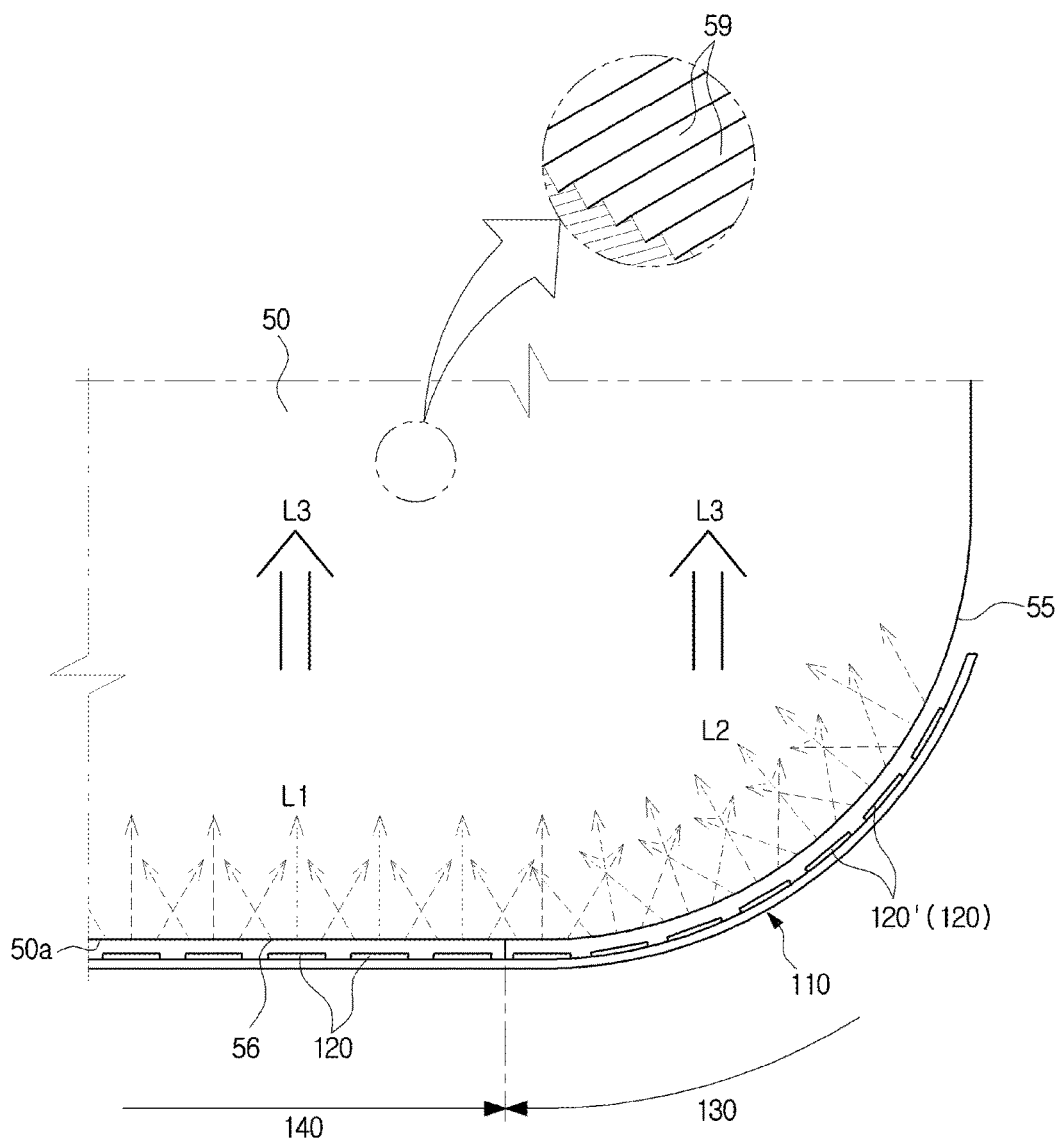
FIG. 4 is a front view of a light source module and a light guide plate of a display apparatus according to an example embodiment.

Accordingly, the light source module 100 according to an example embodiment may include round areas 130 corresponding to the fifth round portions 55 of the light guide plate 50, as shown in FIG. 2, FIG. 3, and FIG. 4.

The light source module 100 may include the PCB 110 on which the plurality of light sources 120 are disposed. The PCB 110 may be in the shape of a plate having a longer side 111 extending in correspondence to the length of the side surface 50a of the light guide plate 50 and a shorter side 112 that is substantially orthogonal to the longer side 111.

The plurality of light sources 120 may be disposed at intervals along the longer side 111 extending in correspondence to the length of the side surface 50a of the light guide plate 50. Accordingly, light generated by the plurality of light sources 120 may be radiated to the side surface 50a of the light guide plate 50 to be transferred to the entire light guide plate 50.

The PCB 110 may be in the shape of a thin bar having a longer side 111. The shorter side 112 of the PCB 110 that is substantially orthogonal to the longer side 111, may extend to a predetermined length to form a plate having a predetermined area defined by the longer side 111 and the shorter side 112 (length of the longer side 111×length of the shorter side 112), which may provide space to dispose a printed circuit electrically connected to the plurality of light sources 120. Accordingly, by adjusting the shorter side 112 of the PCB 110, a printed circuit may be disposed on a part of the surface of the PCB 110.

In order to effectively radiate light to the side surface 50a of the light guide plate 50 having a curved surface formed in the fifth round portions 55, at least a portion of the PCB 110 that is disposed in the round areas 130 may be rounded in correspondence to the fifth round portions 55.

That is, both end portions of the longer side 111 of the PCB 110 may be rounded along a curve corresponding to a curvature of the fifth round portions 55. Since both end portions of the longer side 111 of the PCB 110 may be rounded, both end portions of the surface of the PCB 110 may also be rounded in correspondence to the longer side 111.

Since the entire surface of both of the end portions is rounded in correspondence to the longer side 111, the area of the PCB 110 may increase, and accordingly, the volume of space where the PCB 110 is disposed in the display apparatus 1 may also increase, resulting in an increase in volume of the display apparatus 1.

In a high-definition display apparatus, a PCB configured to perform local dimming to adjust brightness differences may be used.

However, to enable local dimming, since a printed circuit that is more complex than a typical printed circuit included in a PCB that is incapable of local dimming is needed, ensuring an area for a complex printed circuit to be disposed on a PCB by increasing the length of the shorter side of the PCB may be needed.

That is, the shorter side of a PCB capable of performing local dimming may need to be longer than that of a PCB incapable of performing local dimming.

Accordingly, if the PCB 110 capable of performing local dimming is disposed inside the display apparatus 1, the surface area of the PCB 110 that is rounded in the round areas 130 may increase, which may lead to an increase in size of the display apparatus 1.

In order to overcome the problem of the size of the display apparatus 1 increasing, the light source module 100 may be configured such that the length of a first shorter side 112a disposed in each round area 130 is shorter than the length of a second shorter side 112b disposed in the remaining area excluding the round areas 130. Accordingly, it is possible to reduce or minimize an increase of the size the display apparatus 1 by the light source module 100 including the round areas 130, resulting in an increase of the productivity of the PCB 110. Also, by reducing or minimizing a surface 115 included in the round areas 130, it is possible to more easily install the middle mold 40 on which the PCB 110 is mounted.

According to an example embodiment, the light source module 100 may be disposed to correspond to the lower side surface of the light guide plate 50, and accordingly, the lower side surface 50a of the light guide plate 50 may become the incident surface of the light guide plate 50.

However, embodiments are not limited thereto. For example, the light source module 100 may be disposed to correspond to the upper side surface of the light guide plate 50, or a pair of light source modules 100 may be disposed to correspond to the upper side surface and the lower side surface of the light guide plate 50. Also, the light source module 100 may be disposed to correspond to the right side surface or the left side surface of the light guide plate 50, or a pair of light source modules 100 may be disposed to correspond to the right and left side surfaces of the light guide plate 50.

For example, as shown in FIG. 3, the PCB 110 may be divided into the round areas 130 including curved surfaces 115, and a flat area 140 including a flat surface 116.

The round areas 130 may be disposed at both end portions of the PCB 110 extending in the direction of the longer side 111. The flat area 140 may be disposed between the round areas 130.

The round areas 130 may be disposed to correspond to locations at which the round portions 55 of the light guide plate 50 are disposed, and the flat area 140 may be disposed to correspond to a location at which a flat portion formed between the round portions 55 formed at the corners of the light guide plate 50 is disposed.

In the round areas 130, the PCB 110 may have a bar shape rounded along the curved surfaces 115, and in the flat area 140, the PCB 110 may have a flat plate shape including the flat surface 116.

In the flat area 140, the flat surface 116 on which a complex printed circuit can be mounted may be disposed so that the plurality of light sources 120 may be electrically connected to each other through the complex printed circuit to perform local dimming. In the round areas 130, a minimum surface on which the plurality of light sources 120 can be mounted may be disposed so that the PCB 110 of the round areas 130 can be more easily bent, an installation area of the PCB 110 can be reduced or minimized, and the PCB 110 can be more easily installed.

In other words, by limiting the surface of the PCB 110 of the round areas 130 and disposing the complex printed circuit on the flat surface 116 of the flat area 140, the PCB 110 can more easily include the curved surfaces 115, while performing local dimming.

That is, since the shorter side 112a of the PCB 110 in each round area 130 is shorter than the shorter side 112b of the PCB 110 (or the flat surface 116) in the flat area 140, a surface area formed by the longer side 111 and the shorter side 112a in the round area 130 can be reduced or minimized, and a surface area formed by the longer side 111 and the shorter side 112b in the flat area 140 can be of a size on which a complex printed circuit can be mounted.

A length of the shorter side 112b of the flat area 140 may be defined as a length or a width D2 of the shorter side of the flat surface 116 in the flat area 140, as shown in FIG. 3. However, the length of the shorter side 112b of the flat area 140 may be defined as a length or a width D1+D2 obtained by adding the length or the width D2 of the shorter side 112b of the flat surface 116 in the flat area 140 and a length or width D1 of the shorter side 112a of the round area 130 on which the plurality of light sources 120 are disposed.

That is, the length of the shorter side 112b of the flat area 140 may be defined as any one of the length D2 of the shorter side of the flat surface 116 and the length D1+D2 of the flat surface 116 and the area on which the plurality of light sources 120 are disposed. In an example embodiment, the length of the shorter side 112b of the flat area 140 may be defined as the length D2 of the shorter side of the flat surface 116, although embodiments are not limited thereto.

According to an example embodiment, the length of the shorter side 112a in the round area 130 may be set to a minimum length on which the plurality of light sources 120 can be mounted and a printed circuit connecting the plurality of light sources 120 to each other can be mounted.

As described above, the PCB 110 may be configured such that the plurality of light sources 120 can perform local dimming, wherein the plurality of light sources 120 may be grouped into several units 121 and the individual units 121 may be controlled to have different brightness levels.

A plurality of light sources 120' disposed in the round area 130 among the plurality of light sources 120 may be grouped into a round area unit 121' to radiate light of the same brightness level. Accordingly, a plurality of light sources 120" disposed closest to the flat area 140 among the plurality of light sources 120 disposed in the round area 130 may receive an electrical signal through the printed circuit mounted on the flat area 140, and transfer the electrical signal received from the flat area 140 to all of the plurality of light sources 120' disposed in the round area 130.

The first shorter side 112a may correspond to the width D1 of the round area 130, and the second shorter side 112b may correspond to the width D2 of the flat area 140. Accordingly, the width D1 of the round area 130 may be shorter than the width D2 of the flat area 140.

Since the width D1 of the round area 130 may be shorter than the width D2 of the flat area 140, an empty space 117 may be formed in the round area 130. The PCB 110 disposed in the round area 130 may include the curved surfaces 115 having various curvatures.

That is, the empty space 117 may be formed between the flat surface 116 and the curved surfaces 115, and disposed around both ends of the flat surface 116. Since an empty space 117 is formed, the curved surfaces 115 can have a round shape of various curvatures, and may be more easily installed between the middle mold 40 and the light guide plate 50 (see FIG. 5B).

The PCB 110 disposed in the round area 130 may include a flexible material. Accordingly, the PCB 110 disposed in the round area 130 may be shaped to include the curved surfaces 115 upon molding, or the PCB 110 may be shaped as a flat plate upon molding and then a flexible material may be added to the PCB 110 so that the PCB 110 can be bent.

Also, since the empty space 117 is formed between the curved surfaces 115 and both ends of the flat surface 116, as described above, the PCB 110 disposed in the round area 130 can be bent to have various curvatures if the PCB 110 includes a flexible material.

According to an example embodiment, the PCB 110 may include a mounted portion 150 on which the plurality of light sources 120 are mounted, and a non-mounted portion 160 on which none of the plurality of light sources 120 is mounted.

The mounted portion 150 may include the entire area on which the plurality of light sources 120 are arranged along the longer side 111 of the PCB 110. The mounted portion 150 may include a minimum area on which the plurality of light sources 120 and the printed circuit electrically connecting the plurality of light sources 120 to each other can be disposed. That is, the mounted portion 150 may include a surface area defined by the longer side 111 and the shorter side 112a of the round area 130.

Both end portions of the mounted portion 150 may be formed as the curved surfaces 115 to include round shapes. That is, both end portions of the mounted portion 150 may be disposed in the round areas 130 to be rounded in correspondence to the fifth round portions 55 of the light guide plate 50.

The non-mounted portion 160 may be an area in which none of the plurality of light sources 120 is disposed, as described above, and a printed circuit may be disposed in the non-mounted portion 160 so that the plurality of light sources 120 can perform local dimming.

The non-mounted portion 160 may include a surface area defined by the second shorter side 112b and the length of a part of the longer side 111 forming the flat area 140. That is, the non-mounted portion 160 may be disposed in the flat surface 116. Accordingly, the non-mounted portion 160 may not include any round shape.

The PCB 110 may include a bent portion 118 so that the mounted portion 150 can be bent with respect to the non-mounted portion 160 to be orthogonal to the non-mounted portion 160. Accordingly, the mounted portion 150 may face the side surface 50a of the light guide plate 50 (see FIG. 4), and the non-mounted portion 160 may face the light guide plate 50 in the front-rear direction of the light guide plate 50 to be layered with the light guide plate 50. Accordingly, the display apparatus 1 may have a slimmer outer appearance.

As shown in FIG. 4, the PCB 110 may be disposed such that the plurality of light sources 120 face the side surface 50a of the light guide plate 50. Accordingly, light can be uniformly radiated to the flat portions 56 and the round portions 55 of the side surface 50a of the light guide plate 50.

The plurality of light sources 120' disposed in the round area 130 may be arranged at equidistant intervals. The plurality of light sources 120' disposed in the round area 130 may be arranged at the same intervals as those between the plurality of light sources 120 arranged on the flat area 140, or at equidistant intervals that are different from those between the plurality of light sources 120 arranged in the flat area 140. A distance between the plurality of light sources 120' disposed in the round area 130 may be set depending on the curvature of the curved surface 115 of the round area 130.

As shown in FIG. 4, light L1 radiated from the flat area 140 and light L2 radiated from the round area 130 may be radiated at a uniform amount to the side surface 50a of the light guide plate 50 along the longer side 111 of the PCB 110. In the side surface 50a of the light guide plate 50, a concavo-convex structure 59 formed in the shape of straight lines may be formed to transfer light straightly in one direction.

Thereby, light L1 and L2 radiated to the light guide plate 50 may be guided through the concavo-convex structure 59 so that light L3 may be transmitted in a predetermined direction inside the light guide plate 50. Accordingly, by light being transferred straightly in the predetermined direction in the light guide plate 50, adjusting brightness differences through local dimming may be more easily performed.

Figure 5A:
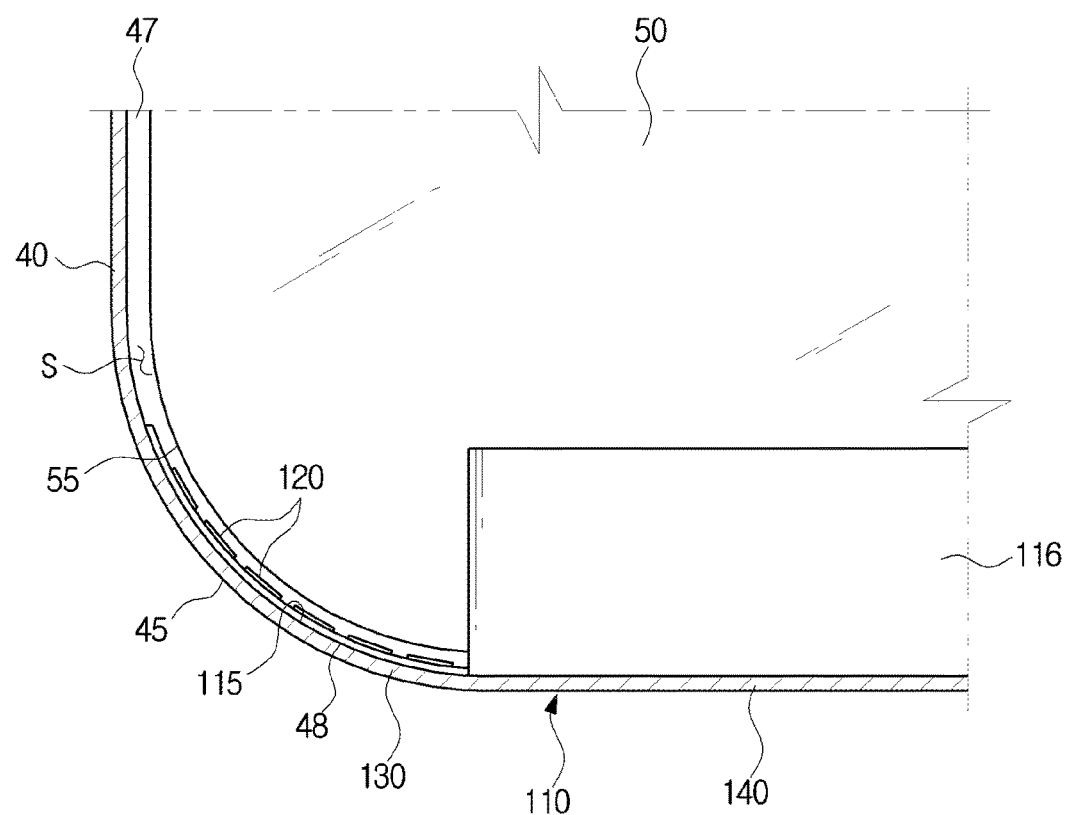
FIGS. 5A and 5B show a state in which a PCB of a display apparatus according to an example embodiment is installed in a middle mold.
Figure 5B:
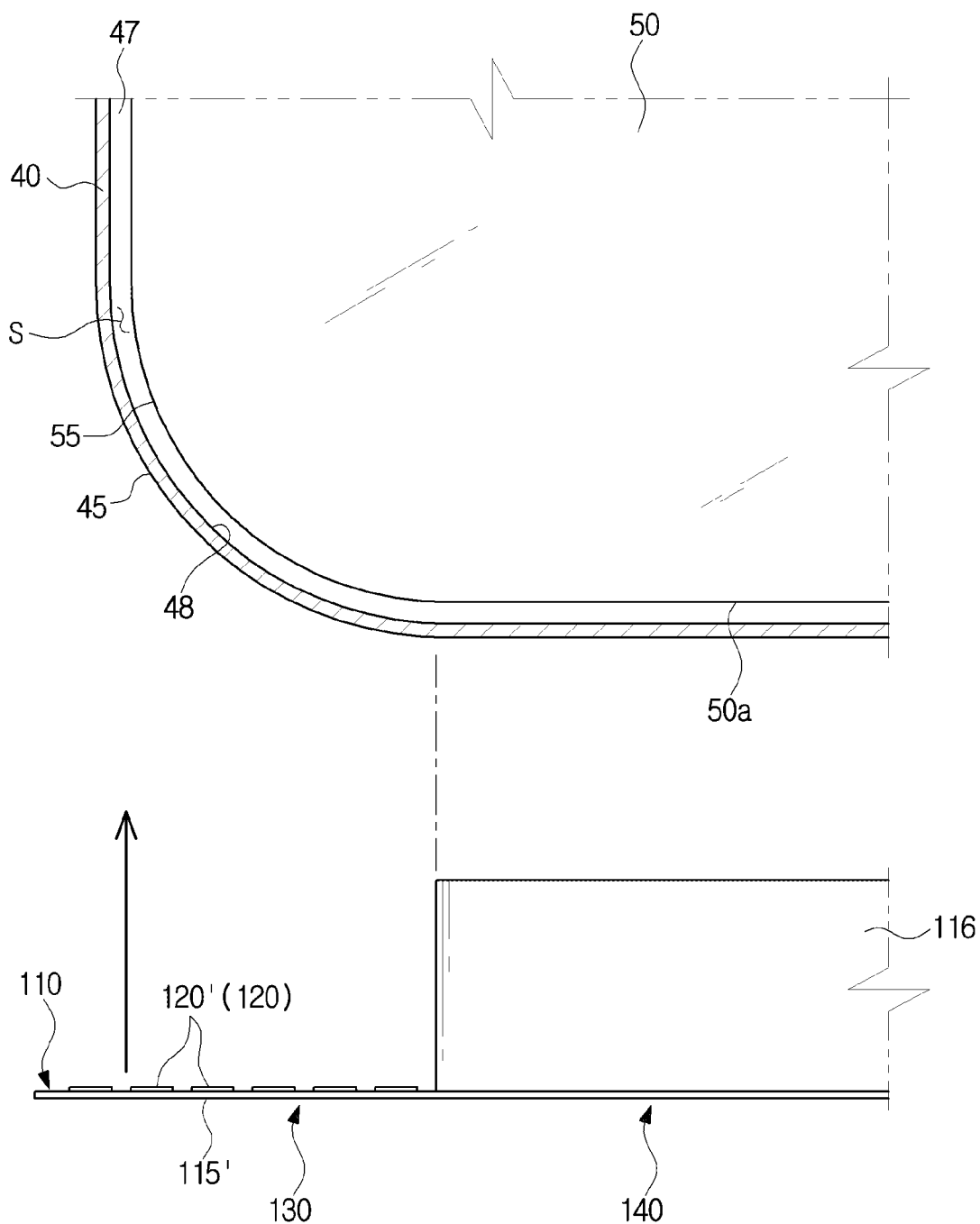

As shown in FIGS. 5A and 5B, the PCB 110 may be disposed in a space S between a PCB support portion 48 of the middle mold 40 and the side surface 50a of the light guide plate 50. More specifically, the middle mold 40 and the light guide plate 50 may include the fourth round portions 45 and the fifth round portions 55, respectively, corresponding to the first round portions 15 of the display panel 10, as described above. The PCB 110 disposed in the round areas 130 may be positioned in the space S between the fourth round portions 45 of the middle mold 40 and the fifth round portions 55 of the light guide plate 50.

The light guide plate 50 may be in contact with a light guide plate support portion 47 of the middle mold 40 in the front-rear direction to be supported by the middle mold 40, and the PCB 110 may be in contact with the PCB support portion 48 which forms the inner side surface of the middle mold 40 to be supported by the middle mold 40.

The flat surface 116 may face the light guide plate 50 in the front-rear direction by being bent at the bent portion 118, as described above.

According to an example embodiment, as shown in FIG. 5B, the PCB 110 disposed in the round area 130 may be provided with a bendable flat surface 115', instead of being molded to have the curved surface 115. The bendable flat surface 115' may include a material that may be easily bent by pressure.

Accordingly, if the PCB 110 disposed in the round area 130 is disposed in the PCB support portion 48 of the middle mold 40, the PCB 110 may be bent along the round shape of the PCB support portion 48 to form the curved surface 115 as shown in FIG. 5A.

That is, the PCB 110 disposed in the round area 130 may be maintained in the shape of the flat surface 115' before it is supported by the middle mold 40, and when the PCB 110 is supported by the PCB support portion 48, the PCB 110 may be bent corresponding to the round shape of the PCB support portion 48 having a curvature of the fourth round portions 45 to be supported in the shape of the curved surface 115 by the middle mold 40.

Hereinafter, a PCB 110a according to an example embodiment will be described. Other configurations except for the PCB 110a which will be described below are the same as those of the display apparatus 1 according to the above-described example embodiment, and accordingly, a detailed description thereof will be omitted. Also, the other configurations described above will not be shown in the following drawings.

Figure 6:
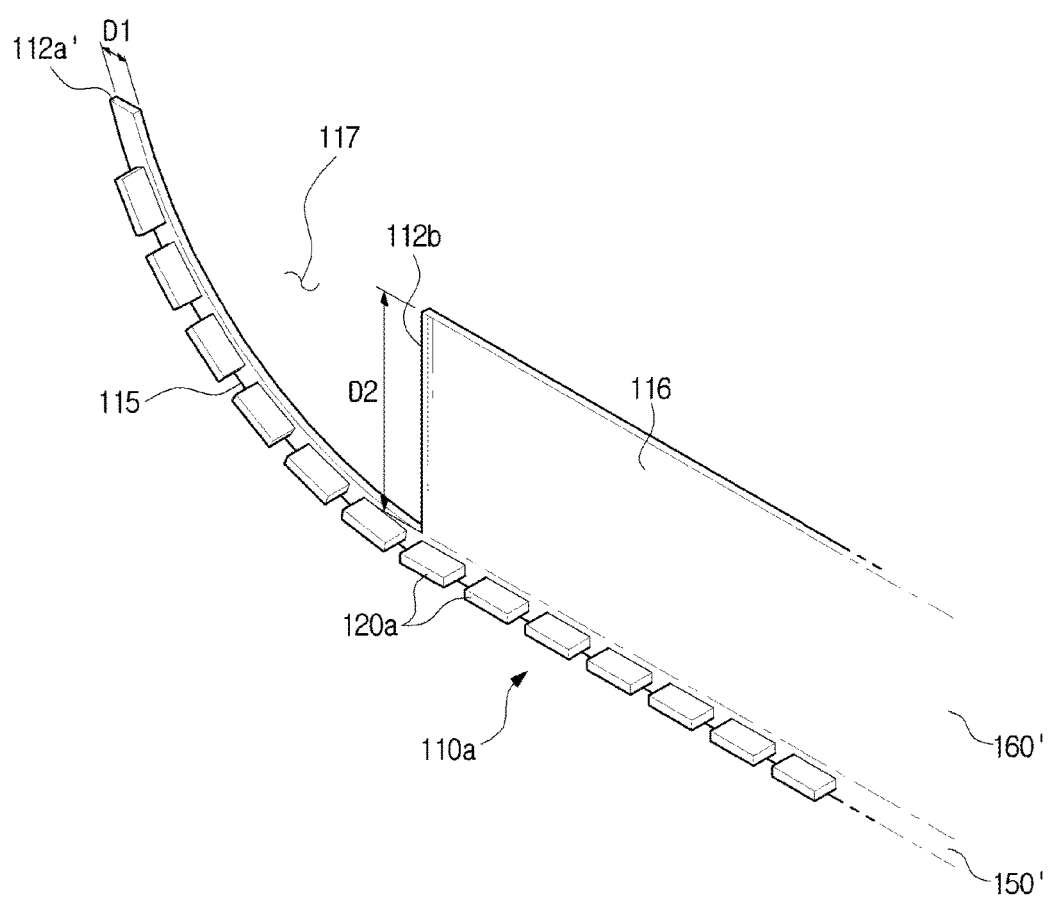
FIG. 6 is a perspective view of a PCB of a display apparatus according to an example embodiment.

As shown in FIG. 6, in an example embodiment, the PCB 110a may not include a bent portion 118, unlike the PCB 110 according to the above-described example embodiment.

For example, the plurality of light sources 120a may be mounted on the PCB 110a such that one of the side surfaces of each of the plurality of light sources 120a are in contact with the PCB 110a. Accordingly, the plurality of light sources 120a may face the side surface 50a of the light guide plate 50 without the bent portion 118.

Accordingly, a mounted portion 150' and a non-mounted portion 160' may be aligned, and a surface on which the plurality of light sources 120a are disposed may be aligned with the flat surface 116. Also, a first shorter side 112a' and the second shorter side 112b may be aligned. Accordingly, when the PCB 110a is manufactured, a process of bending the PCB 110a is not needed, which may lead to an increase in the efficiency of the manufacturing process.

Also, instead of the rear surfaces of the plurality of light sources 120 being mounted on the mounted portion 150 as in the above-described example embodiment, one of the side surfaces of each the plurality of light sources 120a may be mounted on the mounted portion 150' which may reduce a length of the first shorter side 112a' of the PCB 110a. That is, a width D1 of the PCB 110a disposed in the round area 130 may be reduced which may enable the PCB 110a disposed in the round area 130 to be more easily bent.

In the PCB 110a, the first shorter side 112a' may be shorter than the second shorter side 112b. The width D1 of the PCB 110a disposed in the round area 130 may be less than the width D2 of the PCB 110a disposed in the flat area 140, thereby forming empty space 117 between the curved surface 115 and the second shorter side 112b.

Hereinafter, a light source module 200 according to another example embodiment will be described. Other configurations except for the light source module 200 which will be described below are the same as those of the display apparatus 1 according to the above-described example embodiment, and accordingly, a detailed description thereof will be omitted. Also, the other configurations described above will not be shown in the following drawings.

Figure 7:
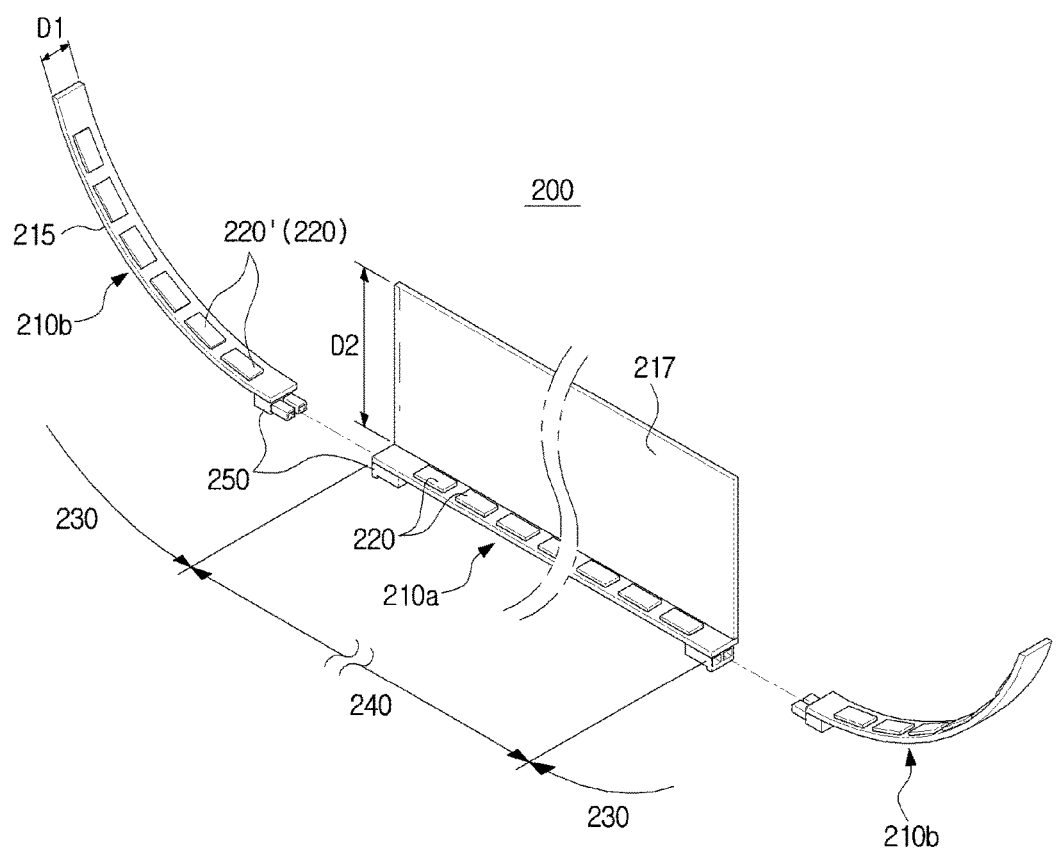
FIG. 7 is a perspective view of a PCB of a display apparatus according to an example embodiment.

As shown in FIG. 7, the light source module 200 may include a plurality of PCBs 210a and 210b (also, referred to as a first PCB 210a and a second PCB 210b) on which a plurality of light sources 220 are mounted. The PCBs 210a and 210b may be separable from each other. For example, the first PCB 210a may be disposed in the flat area 240, and the second PCB 210b may be disposed in the round area 230.

The second PCB 210b may be connected to both ends of the first PCB 210a and may be separated from the first PCB 210a, as shown in FIG. 7. The first PCB 210a may be coupled with or separated from the second PCB 210b by a PCB connector 250 to transfer an electrical signal transferred from a printed circuit mounted on a flat surface 217 to the second PCB 210b through the PCB connector 250.

The second PCB 210b may include a curved surface 215 formed to correspond to the fifth round portions 55 of the light guide plate 50. Accordingly, the second PCB 210b may include a round shape. For example, the second PCB 210b may be molded to a round shape, or may include a flexible material that may be bent.

Unlike the second PCB 210b, the first PCB 210a may include the flat surface 217 which is in a shape of a plate and is inflexible. A printed circuit may be mounted on the flat surface 217 to enable the plurality of light sources 220 to perform local dimming through the first and second PCBs 210a and 210b. The plurality of light sources 220' disposed on the second PCB 210b may be connected through the PCB connector 250 to the printed circuit mounted on the flat surface 217 to perform local dimming.

The width D2 of the first PCB 210a may be greater than the width D1 of the second PCB 210b. The second PCB 210b disposed in the round area 230 can be more easily bent when the width D2 is shorter, similar to the PCB 110 according to the above-described example embodiment.

Hereinafter, a light source module 300 according to an example embodiment will be described. Other configurations except for the light source module 300 which will be described below are the same as those of the display apparatus 1 according to the above-described example embodiment, and accordingly, a detailed description thereof will be omitted. Also, the other configurations described above will not be shown in the following drawings.

Figure 8:
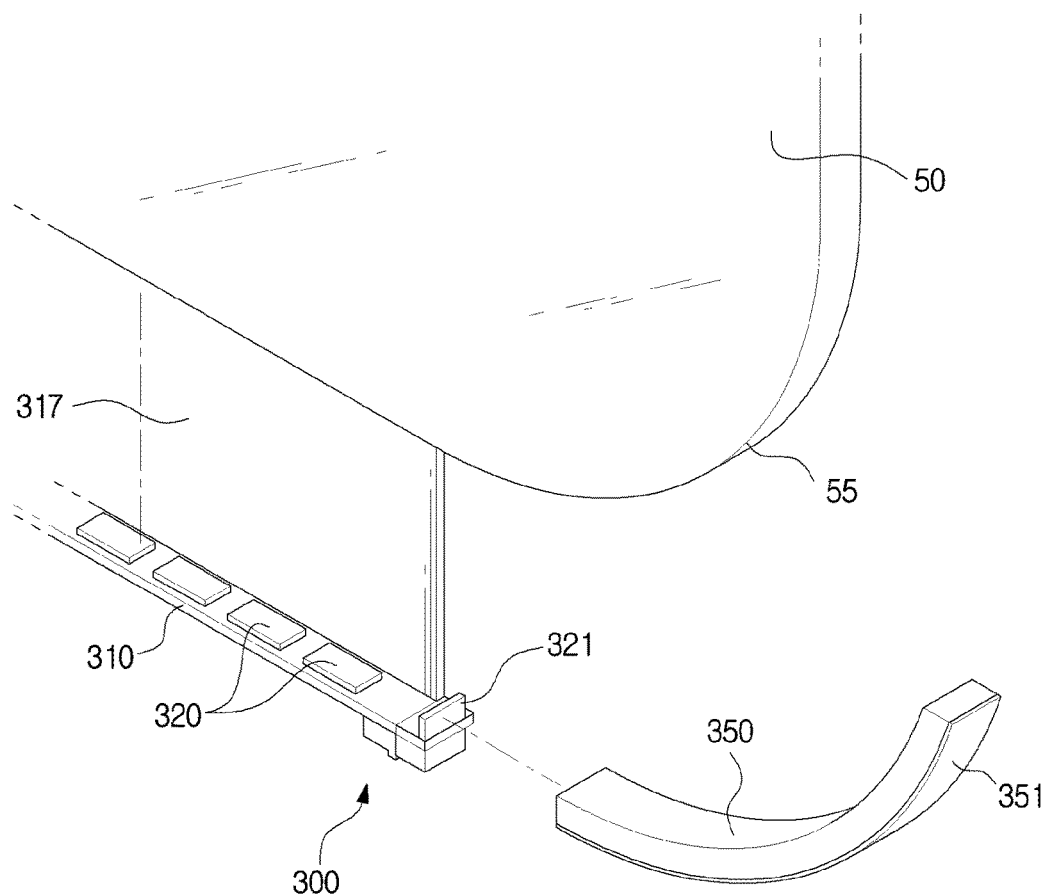
FIG. 8 is a perspective view of a light source of a display apparatus according to an example embodiment.
Figure 9:
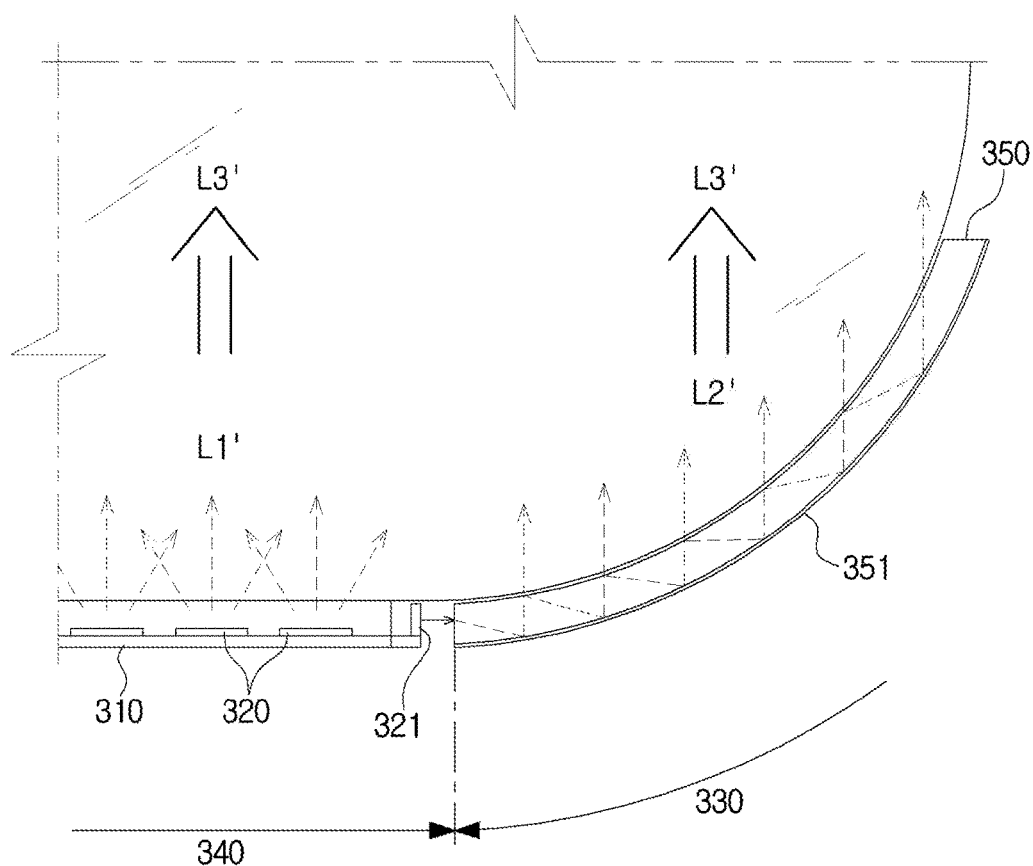
FIG. 9 is a front view of a light source and a light guide plate of a display apparatus according to an example embodiment.

As shown in FIG. 8 and FIG. 9, the light source module 300 may include a PCB 310 formed in the shape of a plate. The PCB 310 may include a plurality of first light sources 320 to radiate light toward the light guide plate 50. The PCB 310 may include a flat surface 317 on which none of the first light sources 320 is mounted.

A printed circuit may be mounted on the flat surface 317 to enable the first light sources 320 and a plurality of second light sources 310 (which will be described later) to perform local dimming through the PCB 310.

The PCB 310 may have a length corresponding to the flat portion 56 of the light guide plate 50. Accordingly, the PCB 310 may be disposed on the inner surface of a flat area 340, but not on the round area 330, so that the PCB 310 includes no curved surface. Accordingly, the PCB 310 may be more easily manufactured compared to the PCB 110 according to the above-described example embodiment.

The light source module 300 may include a reflective member 350 disposed in the round area 330. The reflective member 350 may be rounded to correspond to the fifth round portions 55. The reflective member 350 may reflect light radiated from the second light sources 321 to guide the light to the fifth round portions 55.

The reflective member 350 may be formed as an auxiliary light guide plate. A pattern portion 351 may be disposed on the outer surface of the auxiliary light guide plate to reflect light radiated from the second light sources 321 to the fifth round portions 55. In the inner surface of the pattern portion 351, a triangular concavo-convex structure such as prisms may be formed to reflect light incident from one direction toward another direction.

The pattern portion 351 may be replaced with another member such as, for example, a reflective film.

The first light sources 320 may be disposed such that the rear surfaces of the first light sources 320 are mounted on the PCB 310, and the second light sources 321 may be disposed such that one of the side surfaces of each of the first light sources 320 are mounted on the PCB 310. Accordingly, light radiated from the first light sources 320 may be orthogonal to light radiated from the second light sources 321.

The PCB 310 may adjust a brightness difference of light radiated from the first light sources 320 and the second light sources 321 through the printed circuit disposed on the flat surface 317 to perform local dimming.

Light L1' radiated from the first light sources 320 in the flat area 340 and light L2' radiated from the auxiliary light guide plate 50 in the round area 330 may be uniformly radiated to the light guide plate 50 to be transferred to the display panel 10 as light L3' being straight toward one direction. The first light sources 320 and the second light sources 321 may perform local dimming by the light L3' being straight toward one direction.

Hereinafter, a display apparatus 1" according to an example embodiment will be described. Other configurations except for the display apparatus 1" which will be described below are the same as those of the display apparatus 1 according to the above-described example embodiment, and accordingly, a detailed description thereof will be omitted. Also, the other configurations described above will not be shown in the following drawings.

Figure 10:
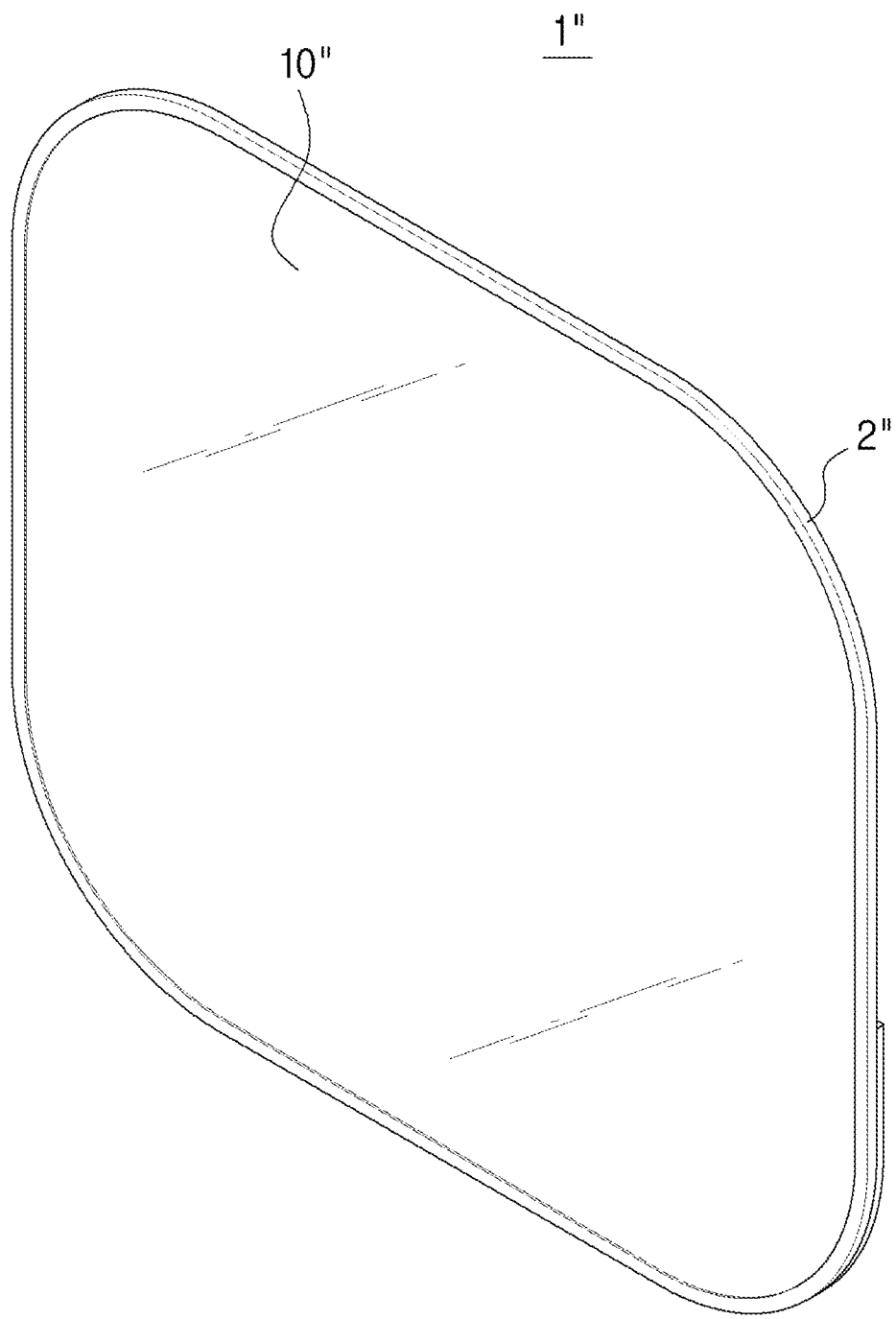
FIG. 10 is a perspective view of a display apparatus according to an example embodiment.
Figure 11:
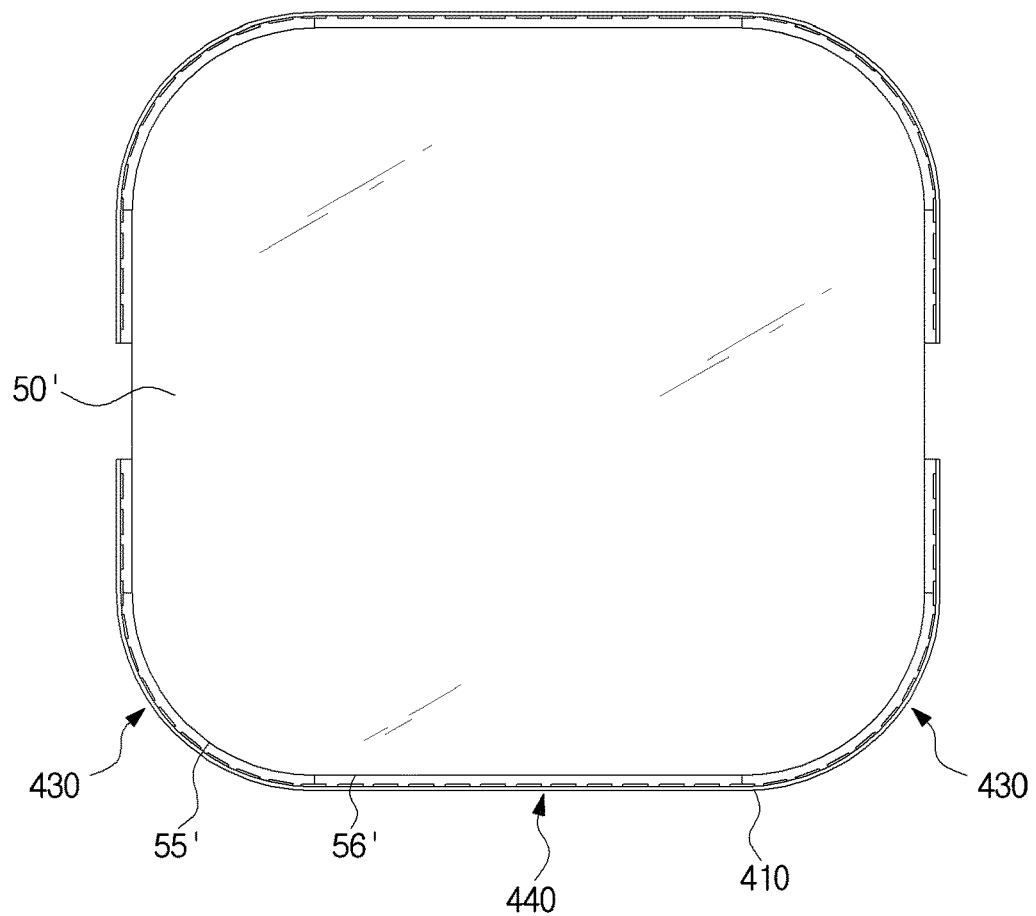
FIG. 11 is a rear view of a light guide plate and a PCB of a display apparatus according to an example embodiment.
Figure 12:
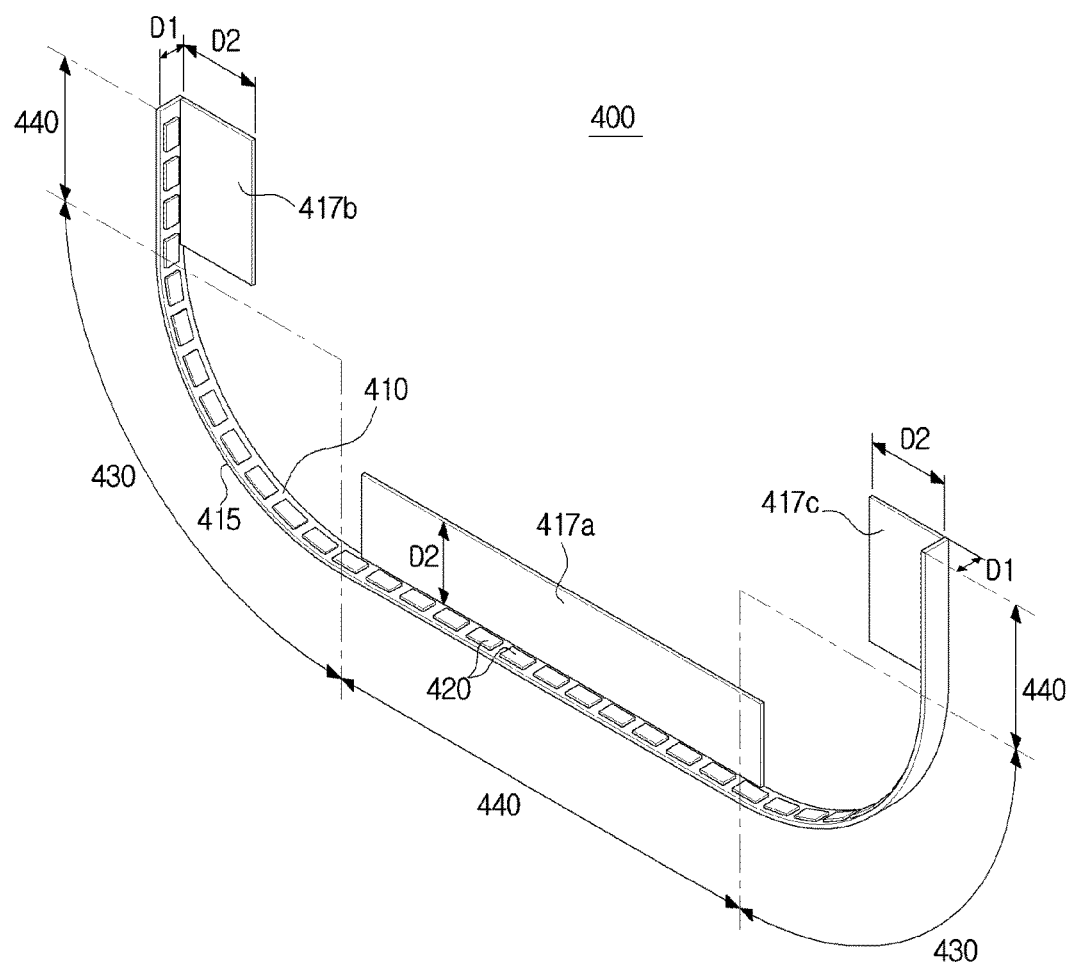
FIG. 12 is a perspective view of a PCB of a display apparatus according to an example embodiment.

As shown in FIGS. 10, 11, and 12, corners 2" of the display apparatus 1" may include a longer curve. Accordingly, fifth round portions 55' of a light guide plate 50' may also be longer than the fifth round portions 55 according to the above-described example embodiment.

A light source module 400 may be disposed along one side surface of the light guide plate 50'. The light source module 400 may radiate light to the side surface of the light guide plate 50' to enable light to be transferred towards the front direction from the light guide plate 50'.

The light source module 400 may be disposed along the upper and lower side surfaces of the light guide plate 50', as shown in FIG. 11. However, embodiments are not limited thereto, and the light source module 400 may be disposed along any one of the upper and lower side surfaces of the light guide plate 50', along the left and right side surfaces of the light guide plate 50', or along any one of the left and right side surfaces of the light guide plate 50'.

If round areas 430 of a PCB 410 of the light source module 400 are connected to both ends of flat areas 440, similar to the above-described example embodiment, it may be difficult to perform local dimming since a plurality of light sources 420 disposed in the round areas 430 may radiate light of the same brightness level.

In order to overcome the problem, in the light source module 400 according to an example embodiment, the round areas 430 may be disposed between the plurality of flat areas 440.

That is, both end portions of the light source module 400 may be formed in the flat areas 440, additional flat areas 440 may be disposed in the center of the light source module 400, and round areas 430 may be disposed between four flat areas 440.

As shown in FIG. 12, for example, in the flat areas 440 disposed in the center, a part of the PCB 410 having a first flat surface 417a may be disposed. In the flat areas 440 disposed at both end portions, parts of the PCB 410 having a second flat surface 417b and a third flat surface 417c may be disposed.

In the round areas 430 disposed between the flat areas 440, the other parts of the PCB 410 not including flat surfaces 417a, 417b, and 417c may be disposed.

A width D1 of the PCB 410 disposed in the round areas 430 may be shorter than a width D2 of the PCB 410 disposed in the flat areas 440 so that curved surfaces 415 of the PCB 410 can be more easily formed in the round areas 430.

If the corners 2" of the display apparatus 1" forms longer curved surfaces so that the PCB 410 has longer curved surfaces 415, and accordingly, the number of the plurality of light sources 420 disposed in the round areas 430 increases so that the plurality of light sources 420 disposed in the round areas 430 are connected into a single unit, it may be difficult to perform local dimming.

Accordingly, by disposing the flat surfaces 417a, 417b, and 417c on which a printed circuit can be mounted at both ends of the round areas 430 to divide the plurality of light sources 420 disposed in the round areas 430 into two units, local dimming may be performed.

For example, a part of the plurality of light sources 420 disposed in the round area 430 corresponding to the fifth round portion 55' disposed adjacent to the left side surface of the light guide plate 50' may form a unit by a printed circuit mounted on the first flat surface 417a to radiate light, and the other part of the plurality of light sources 420 disposed in the round area 430 may form another unit by a printed circuit mounted on the second flat surface 417b to radiate light. Similarly, a part of the plurality of light sources 420 disposed in the round area 430 corresponding to the fifth round portion 55' disposed adjacent to the right side surface of the light guide plate 50' may form a unit by a printed circuit mounted on the first flat surface 417a to radiate light, and another unit by a printed circuit mounted on the second flat surface 417b to radiate light Accordingly, the plurality of light sources 420 disposed in the round area 430 may be divided into two units so that the respective units can radiate light of different brightness levels to the light guide plate 50, thereby more easily performing local dimming.

According to the example embodiments as described above, since the PCB includes the round areas corresponding to the round portions of the light guide plate, and the plurality of light sources are arranged on the curved surfaces to effectively radiate light to the round portions of the light guide plate, it is possible to more effectively radiate light to the entire display panel including the round portions and enhance the outer appearance of the display apparatus.

Although example embodiments have been shown and described, it would be appreciated by those skilled in the art that changes may be made therein without departing from the principles and spirit of the present disclosure, as defined in the claims and their equivalents.

What is claimed is:
1. A display apparatus comprising:
a display panel;
a light guide plate configured to guide light toward the display panel, the light guide plate comprising a flat portion and a round portion; and
a printed circuit board (PCB) comprising a first area configured to radiate light toward the round portion, and a second area extended from the first area and configured to radiate light toward the flat portion,
wherein the first area and the second area are both formed on a same side of the PCB, and a width of the first area is less than a width of the second area.
2. The display apparatus according to claim 1, wherein the PCB further comprises a curved surface provided in the first area and corresponding to the round portion of the light guide plate.

3. The display apparatus according to claim 2, wherein the display panel comprises a first round portion corresponding to the round portion of the light guide plate.

4. The display apparatus according to claim 3, further comprising:
a top chassis disposed in front of the display panel and comprising a second round portion corresponding to the round portion of the light guide plate;
a bottom chassis disposed behind the display panel and coupled with the top chassis, and comprising a third round portion corresponding to the round portion of the light guide plate; and
a middle mold disposed between the top chassis and the bottom chassis and comprising a fourth round portion corresponding to the round portion of the light guide plate.

5. The display apparatus according to claim 4, wherein the curved surface of the PCB is supported by the fourth round portion of the middle mold.

6. The display apparatus according to claim 1, wherein the PCB further comprises a plurality of light sources disposed in the first area and the second area, and
wherein first light sources disposed in the first area among the plurality of light sources are disposed at equidistant intervals.

7. The display apparatus according to claim 6, wherein the PCB is configured to control brightness of light radiated by the plurality of light sources to perform local dimming.

8. The display apparatus according to claim 1, wherein the first area comprises a flexible material.

9. The display apparatus according to claim 1, wherein the first area is disposed at opposite ends of the second area.

10. The display apparatus according to claim 1, wherein the first area is separable from the second area.

11. The display apparatus according to claim 10, wherein the PCB further comprises a connector configured to connect the first area to the second area, and to transfer an electrical signal from the second area to the first area.

12. The display apparatus according to claim 1, wherein the PCB further comprises:
a plurality of light sources;
a light source mounted portion on which the plurality of light sources are disposed; and
a light source non-mounted portion on which none of the plurality of light sources is disposed, and
wherein the light source non-mounted portion is disposed in the second area.

13. The display apparatus according to claim 12, wherein the light source mounted portion is orthogonal to the light source non-mounted portion.

14. A display apparatus comprising:
a display panel comprising a first round portion;
a top chassis disposed in front of the display panel, and comprising a second round portion corresponding to the first round portion of the display panel;
a bottom chassis disposed behind the display panel, and comprising a third round portion corresponding to the first round portion of the display panel;
a middle mold disposed between the top chassis and the bottom chassis, and comprising a fourth round portion corresponding to the first round portion of the display panel;
a light guide plate supported by the middle mold, and comprising a fifth round portion corresponding to the first round portion of the display panel; and
a printed circuit board (PCB) comprising:
a plurality of light sources configured to radiate light;
a mounted portion on which the plurality of light sources are disposed; and
a non-mounted portion on which none of the plurality of light sources is disposed,
wherein the mounted portion comprises a round area corresponding to the fifth round portion of the light guide plate, and
wherein the non-mounted portion is disposed outside the round area.

15. The display apparatus according to claim 14, wherein the first round portion comprises a plurality of first round portions disposed at four corners of the display panel, and
wherein the fourth round portion comprises a plurality of fourth round portions and the fifth round portion comprises a plurality of fifth round portions, the plurality of fourth round portions and the plurality of fifth round portions being disposed at four corners of the middle mold and four corners of the light guide plate, respectively, to correspond to the plurality of first round portions.

16. The display apparatus according to claim 14, wherein the round area is disposed between the fourth round portion and the fifth round portion.

17. The display apparatus according to claim 15, wherein the round area comprises a flexible material.

18. A display apparatus comprising:
a display panel;
a light guide plate configured to guide light toward the display panel, and comprising a flat portion and a round portion;
a reflective member configured to guide light toward the round portion of the light guide plate, and disposed facing a side surface of the round portion;
a printed circuit board (PCB);
a first light source disposed on the PCB and configured to radiate light to the flat portion; and
a second light source disposed on the PCB and configured to radiate light to the reflective member.

19. The display apparatus according to claim 18, wherein the reflective member comprises a curved surface corresponding to the round portion.

20. The display apparatus according to claim 18, wherein the reflective member comprises an auxiliary light guide plate configured to guide light radiated from the second light source toward the round portion of the light guide plate.

* * * * *